United States Patent [19]

Morlok et al.

[11] Patent Number: 4,700,796
[45] Date of Patent: Oct. 20, 1987

[54] REAR AXLE FOR A MOTOR VEHICLE, ESPECIALLY FOR A FOUR-WHEEL DRIVE MOTOR VEHICLE

[75] Inventors: Albrecht Morlok, Nordstetten; Hans Weigele, Stuttgart, both of Fed. Rep. of Germany

[73] Assignee: Dr. Ing. H.c.f. Porsche AG, Weissach, Fed. Rep. of Germany

[21] Appl. No.: 868,052

[22] Filed: May 29, 1986

[30] Foreign Application Priority Data

May 29, 1985 [DE] Fed. Rep. of Germany ....... 3519201

[51] Int. Cl.$^4$ ............................................. B60G 3/00
[52] U.S. Cl. ................................... 180/88; 180/905; 280/689; 280/723; 280/726
[58] Field of Search ................. 180/88, 905; 280/689, 280/723, 726

[56] References Cited

U.S. PATENT DOCUMENTS

| | | | |
|---|---|---|---|
| 1,996,824 | 4/1935 | Nacker et al. | 180/73.1 |
| 2,083,085 | 6/1937 | Palmer | 180/73.1 |
| 3,202,236 | 8/1965 | Allison | 280/723 |
| 3,767,224 | 10/1973 | Schneeweiss | 280/723 |
| 4,362,221 | 12/1982 | Manning | 180/88 |
| 4,486,030 | 12/1984 | Takata et al. | 280/689 |

FOREIGN PATENT DOCUMENTS 2103399 7/1982 Fed. Rep. of Germany .

Primary Examiner—David M. Mitchell
Assistant Examiner—Kenneth R. Rice
Attorney, Agent, or Firm—Barnes & Thornburg

[57] ABSTRACT

A rear axle for a motor vehicle, especially for a four-wheel drive motor vehicle with a torsionally soft cross bearer member, includes longitudinal guide members welded to the ends of the cross bearer, whereby the wheels are supported on the longitudinal guide members; the cross bearer member together with guide members is pivotally connected at the body in bearings which are arranged in the center axis of the cross bearer. The cross bearer includes a center section with an opening for the passage therethrough of a drive shaft. This opening is so large that the drive shaft comes to lie approximately inside of the interior contour formed by the cross section of the bearer.

15 Claims, 4 Drawing Figures

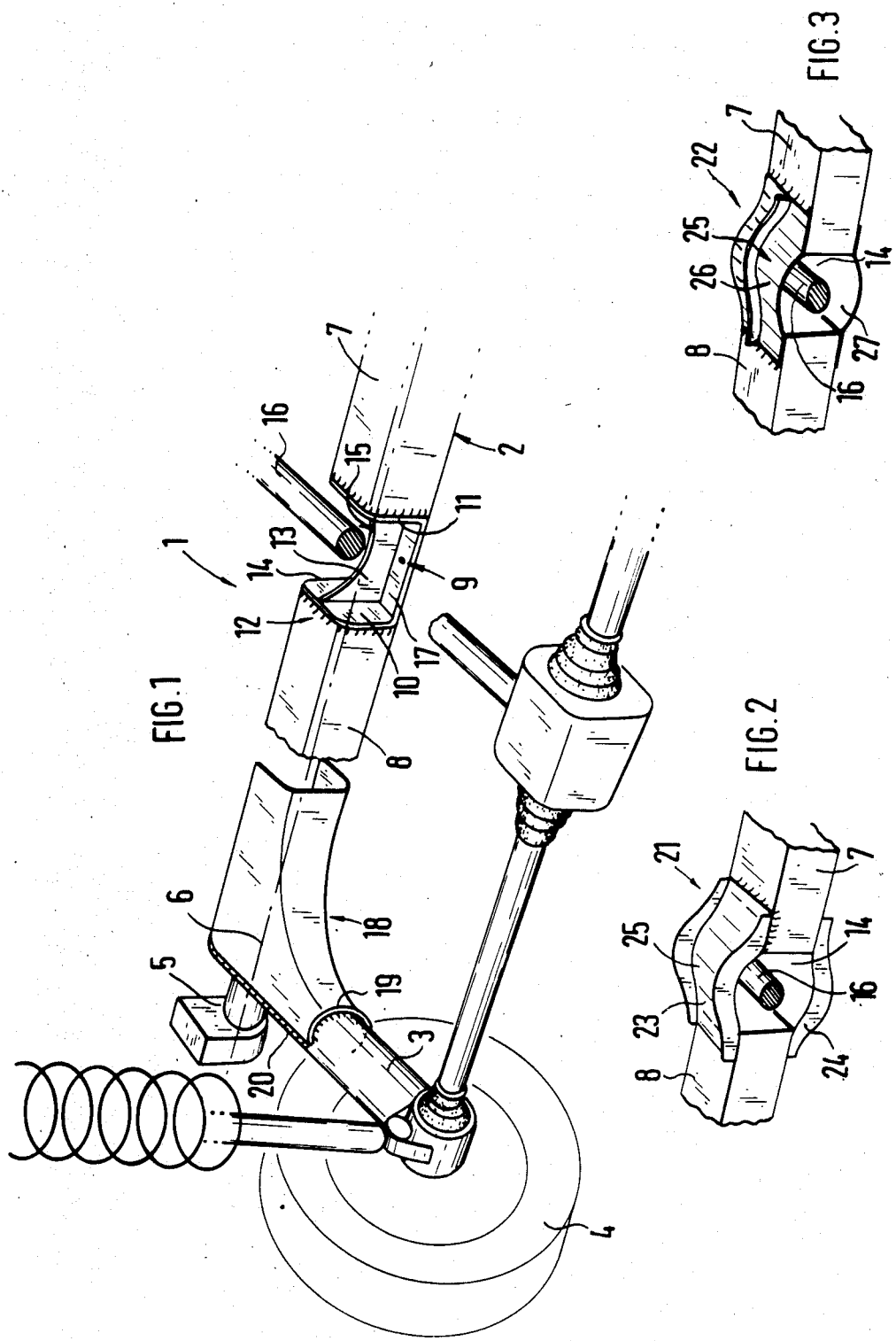

REAR AXLE FOR A MOTOR VEHICLE, ESPECIALLY FOR A FOUR-WHEEL DRIVE MOTOR VEHICLE

BACKGROUND AND SUMMARY OF THE INVENTION

The present invention relates to a rear axle for a motor vehicle, especially for a four-wheel drive motor vehicle with a torsionally soft cross bearer.

A wheel suspension with a torsionally soft cross bearer and with welded-on longitudinal guide members for a motor vehicle is disclosed in the German Pat. No. 21 03 399. The wheels are supported at these longitudinal guide members, whereby only the wheels of the further axle are driven. With the use of such a rear axle for a four-wheel drive motor vehicle, in which the drive shaft is extended up to a differential arranged to the rear of the cross bearer of this axle, the drive shaft would considerably reduce the ground clearance of the vehicle.

It is the object of the present invention to provide a rear axle of the aforementioned type which enables an arrangement of the drive shaft with equal road clearance as is made possible at the further axle and can be used both with a four-wheel drive as also with a single-axle drive.

The underlying problems are solved according to the present invention in that the cross bearer includes a center portion with an opening for a drive shaft, and this opening has such a size that the drive shaft lies approximately inside of the interior contour formed by the cross section of the bearer.

The principal advantages obtained with the present invention reside in that the same rear axle can be used with single-axle and four-wheel drives so that with a refitting, for example, from single-axle drive to four-wheel drive, the rear axle does not have to be exchanged and thus a cost-favorable solution is created. However, also an exchange of the rear axle is without problems because the suspension points are identical for the two constructions, and no additional adjustments have to be undertaken.

The drive shaft extends through the cross bearer of the axle in such a manner that an approximately constant road clearance is assured over the entire vehicle length. In order that no relative movements of the cross bearer take place during the inward and outward spring movement and impair the drive shaft, the cross bearer at the same time forms the axis of rotation of the guide members.

The drive shaft is preferably arranged inside of the interior contour formed by the cross section of the cross bearer so that it extends from the front axle without bending to the rear differential.

The simplification of the rear axle is also assisted in that in the transition from the cross bearer to the longitudinal guide members, no complicated connection or gusset plates with corresponding welded places are necessary. The cross bearer consisting of hot-pressed part is provided with a knee-shaped, formed-on portion at the ends thereof for the connection with the longitudinal guide members which partially form-lockingly surrounds the longitudinal guide member. The welding seams of the connection are provided within the area of smallest possible stresses, whereby also no significant shearing stress occurs within this area.

These and other objects, features and advantages of the present invention will become more apparent from the following description when taken in connection with the accompanying drawing which shows, for purposes of illustration only, several embodiments in accordance with the present invention, and wherein:

BRIEF DESCRIPTION OF THE DRAWINGS

FIG. 1 is a partial perspective view of a rear axle with a U-profile-shaped center section in accordance with the present invention;

FIGS. 2 and 3 are partial perspective views of two further embodiments of center sections in accordance with the present invention;

DETAILED DESCRIPTION OF THE DRAWINGS

Figure 4:
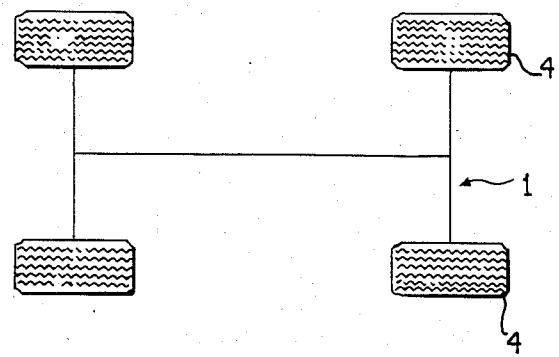
FIG. 4 is a schematic depiction of an all-wheel drive motor vehicle.

Referring now to the drawing wherein like reference numerals are used throughout the various views to designate like parts, and more particularly to FIG. 1, the rear axle generally designated by reference numeral 1 includes a torsionally soft cross bearer generally designated by reference numeral 2 with longitudinal guide members 3 welded to the ends thereof; the wheels 4 are supported on the longitudinal guide members 3. The axle is supported with respect to the vehicle body by way of bearings 5, whereby these bearings 5 are so arranged that the axis of rotation 6 of the guide members 3 during spring movements extends through the center cross axis of the bearer 2 and relative movements of the bearer 2 are thus precluded.

The cross bearer 2 includes essentially two bearer end portions 7 and 8 which are connected with each other by a center section generally designated by reference numeral 9 into a uniformly torsionable unit. This center section 9 is constructed U-profile-shaped in cross section and an opening 14 forming a passage is formed between its legs 10 and 11. These legs 10 and 11 are rigidly connected with the ends of the portions 7 and 8 of the cross bearer 2 by means of welded connections 12. A reinforcing web 13 is secured between the legs 10 and 11 in the opening 14 which is directed vertically and extends in the vehicle transverse direction. This web 13 includes a recess 15 along its edge for the unimpaired extension therethrough of a drive shaft 16 from the front axle differential to the rear axle differential. The size of the opening 14, respectively, of the recess 15 is selected so large that the drive shaft 16 lies approximately inside of the interior contour formed by the cross section of the bearer 2.

The cross bearer 2 is constructed, for example, U-profile-shaped in cross section, whereby its legs extend in horizontal planes and the center section 9 is so retained between the portions 7 and 8 of the bearer 2 that its web 17 lies in a common horizontal plane with the lower leg of the cross bearer 2 and the drive shaft 16 extends between the vehicle floor (not shown) and the reinforcing member 13.

According to a further embodiment shown in FIG. 2, a center section generally designated by reference numeral 21 consists of an upper member 23 and of a lower member 24. These members 23 and 24 form therebetween the free space 14 for the passage of the shaft 16. They are constructed U-profile-shaped and include each an outwardly directed curvature or convexity 25. With their free ends, they are each secured at the cross bearer end portions 7 and 8. The legs of the two members 23 and 24 extend in the horizontal direction.

According to a further modified construction with respect to FIG. 1, the center section generally designated by reference numeral 22 is constructed as T-profile which also includes an outwardly directed curvature or convexity 25. The web of the profile extends in the longitudinal direction of the cross bearer 2. At their ends, the upper member 26 and the lower member 27 forming the center section are connected with the cross bearer end portions 7 and 8.

At least one member 23 or 24, respectively, 26 or 27 is secured at the bearer end portions 7, 8 by a threaded connection in order that the assembly is facilitated.

The cross bearer 2 is preferably constructed as hot-pressed part and includes knee-shaped connecting form-bodies generally designated by reference numeral 18 which are formed-on at the ends. The form-bodies 18 are connected with the longitudinal guide members 3 by welded connections 19 and 20 along the edges thereof. These welded connections are provided preferably within the area of smallest possible stresses.

The connecting form-bodies 18 are drawn through an angle up to the longitudinal plane of the guide members 3 so that the latter are partly form-lockingly surrounded. The first welding seam 19 extends along the end-face of the form-body 18, and the second welding seam 20 extends in the vehicle longitudinal direction along the edges of the two legs of the cross bearer 2.

FIG. 4 is a schematic drawing of an all-wheel drive motor vehicle usable with a preferred embodiment of the present invention.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A rear axle for a motor vehicle, comprising a torsionally soft cross bearer means which includes longitudinal guide members welded to the ends of the cross bearer means, the wheels being adapted to be retained at the longitudinal guide members, bearing means for pivotally supporting the cross bearer means together with the guide members at a relatively fixed vehicle part, said bearing means being arranged substantially in the center axis of the cross bearer means, the cross bearer means including a center section with an opening for a drive shaft and said opening having such a size that the drive shaft lies approximately inside of the interior contour formed by the cross section of the cross bearer means; and
wherein the center section essentially consists of a U-profile with a reinforcing web arranged between the legs thereof which is directed substantially vertically, extends in the vehicle transverse direction and is provided with a recess forming the opening.

2. A rear axle for a motor vehicle according to claim 1, wherein said motor vehicle is an all-wheel drive motor vehicle.

3. A rear axle according to claim 1, wherein the center section is connected with the end portions of the cross bearer means which extend on both sides thereof into a substantially uniformly torsionable unit.

4. A rear axle according to claim 3, wherein the cross bearer means is constructed U-profile-shaped in cross section and the center section is welded with its legs at the facing ends of the cross bearer portions.

5. The rear axle according to claim 4, wherein said center section includes a web which is arranged in a horizontal plane which also contains a lower leg of the cross bearer means.

6. A rear axle according to claim 1, wherein the cross bearer means is constructed as hot-pressed part having two portions extending on both sides of the center section, and wherein the cross bearer portions include each a knee-shaped connecting form-body which is formed-on at the respective end thereof, said knee-shaped connecting form-bodies being connected with the longitudinal guide members by way of welded connections along the edges thereof within the area of relatively small stresses.

7. A rear axle according to claim 6, wherein the knee-shaped connecting form-bodies are drawn up to into the longitudinal plane of the guide members, partially surround the same form-lockingly and are rigidly connected with the guide members by way of a first welding seam at the end thereof as well as by way of a second welding seam extending along the longitudinal edges of the legs of the cross bearer means.

8. A rear axle for a motor vehicle, comprising a torsionally soft cross bearer means which includes longitudinal guide members welded to the ends of the cross bearer means, the wheels being adapted to be retained at the longitudinal guide members, bearing means for pivotally supporting the cross bearer means together with the guide members at a relatively fixed vehicle part, said bearing means being arranged substantially in the center axis of the cross bearer means, the cross bearer means including a center section with an opening for a drive shaft and said opening having such a size that the drive shaft lies approximately inside of the interior contour formed by the cross section of the cross bearer means;
wherein said cross bearer means includes end portions with legs, said cross bearer end portions extending on both sides of the center section, and wherein said center section includes an upper member and a lower member and said upper and lower members are connected with the legs of the two cross bearer end portions around the the opening; and
wherein the members of the center section consist of a torsionally rigid U-profile which have each an outwardly directed convexity between which is formed an enlarged free space for the shaft.

9. A rear axle for a motor vehicle according to claim 8, wherein said motor vehicle is an all-wheel drive motor vehicle.

10. A rear axle for a motor vehicle, comprising a torsionally soft cross bearer means which includes longitudinal guide members welded to the ends of the cross bearer means, the wheels being adapted to be retained at the longitudinal guide members, bearing means for pivotally supporting the cross bearer means together with the guide members at a relatively fixed vehicle part, said bearing means being arranged substantially in the center axis of the cross bearer means, the cross bearer means including a center section with an opening for a drive shaft and said opening having such a size that the drive shaft lies approximately inside of the interior contour formed by the cross section of the cross bearer means; and wherein the cross bearer means is constructed U-profile-shaped in cross section and the center section is welded with its legs at the facing ends of the cross bearer portions.

11. A rear axle according to claim 10, wherein the cross bearer means is constructed as a hot-pressed part having two portions extending on both sides of the center section, and wherein the cross bearer portions include each a knee-shaped connecting form-body which is formed-on at the respective end thereof, said knee-shaped connected form-bodies being connected with the longitudinal guide member by way of welded connections along the edges thereof within the area of relatively small stresses.

12. A rear axle according to claim 11, wherein the knee-shaped connecting form-bodies are drawn up to into the longitudinal plane of the guide members, partially surround the same form-lockingly and are rigidly connected with the guide members by way of a first welding seam at the end thereof as well as by way of a second welding seam extending along the longitudinal edges of the legs of the cross bearer means.

13. A rear axle for a motor vehicle according to claim 10, wherein said motor vehicle is an all-wheel drive motor vehicle.

14. A rear axle for a motor vehicle, comprising a torsionally soft cross bearer means which includes longitudinal guide members welded to the ends of the cross bearer means, the wheels being adapted to be retained at the longitudinal guide members, bearing means for pivotally supporting the cross bearer means together with the guide members at a relatively fixed vehicle part, said bearing means being arranged substantially in the center axis of the cross bearer means, the cross bearer means including a center section with an opening for a drive shaft and said opening having such a size that the drive shaft lies approximately inside of the interior contour formed by the cross section of the cross bearer means;

wherein said cross bearer means includes end portions with legs, said cross bearer end portions extending on both sides of the center section, and wherein said center section includes an upper member and a lower member and said upper and lower members are connected with the legs of the two cross bearer end portions around the opening;

wherein the cross bearer means is constructed as a hot-pressed part, and wherein the cross bearer portions include each a knee-shaped connected form-body which is formed-on at the respective end thereof, said knee-shaped connected form-bodies being connected with the longitudinal guide members by way of welded connections along the edges thereof within the area of relatively small stresses; and wherein the members of the center section consist of a torsionally rigid U-profile which have each an outwardly directed convexity between which is formed an enlarged free space for the shaft.

15. A rear axle for a motor vehicle according to claim 14, wherein said motor vehicle is an all-wheel drive motor vehicle.

* * * * *